(12) United States Patent
Tanaka (10) Patent No.: US 10,819,800 B2
(45) Date of Patent: Oct. 27, 2020

(54) METHODS AND SYSTEMS FOR PROVIDING TIME AND DATE SPECIFIC SOFTWARE USER INTERFACES

(71) Applicant: salesforce.com, inc., San Francisco, CA (US)

(72) Inventor: Jay Tanaka, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 145 days.

(21) Appl. No.: 15/908,656

(22) Filed: Feb. 28, 2018

(65) Prior Publication Data

US 2018/0191833 A1    Jul. 5, 2018

Related U.S. Application Data

(63) Continuation of application No. 14/613,172, filed on Feb. 3, 2015, now Pat. No. 9,948,721, which is a continuation of application No. 12/831,196, filed on Jul. 6, 2010, now Pat. No. 8,977,675.

(60) Provisional application No. 61/317,973, filed on Mar. 26, 2010.

(51) Int. Cl.
*H04L 29/08* (2006.01)
*G06F 9/50* (2006.01)

(52) U.S. Cl.
CPC ............ *H04L 67/14* (2013.01); *G06F 9/5011* (2013.01); *H04L 67/02* (2013.01); *H04L 67/22* (2013.01)

(58) Field of Classification Search
CPC ......... H04L 67/14; H04L 67/22; H04L 67/02; G06F 9/5011
See application file for complete search history.

(56) References Cited

U.S. PATENT DOCUMENTS

| | | | |
|---|---|---|---|
| 5,072,370 A | 12/1991 | Durdik | |
| 5,577,188 A | 11/1996 | Zhu | |
| 5,608,872 A | 3/1997 | Schwartz et al. | |
| 5,649,104 A | 7/1997 | Carleton et al. | |

(Continued)

FOREIGN PATENT DOCUMENTS

WO    WO 2004/059420    7/2004

OTHER PUBLICATIONS

U.S. Office Action dated Aug. 24, 2012 issued in U.S. Appl. No. 12/831,196.

(Continued)

*Primary Examiner* — Jimmy H Tran
(74) *Attorney, Agent, or Firm* — Weaver Austin Villeneuve & Sampson LLP (57) ABSTRACT

Computer systems, methods and software for responding to remote clients with content selected based on when the request is made. The method may include selecting one or more interface components based on the time of day and/or date of the request, and returning a response including the selected interface components. The method may include adjusting the time for a time zone for the remote client and/or user. Interface components may be fully embedded in the response, or may be references to external components. Interface components may include data relating to a user task associated with the date and/or time of day, formatting information for displaying the task data to the user of the remote client, instructions for user interaction with the task data, etc.

20 Claims, 8 Drawing Sheets

(56) References Cited

U.S. PATENT DOCUMENTS

| | | | |
|---|---|---|---|
| 5,715,450 A | 2/1998 | Ambrose et al. | |
| 5,761,419 A | 6/1998 | Schwartz et al. | |
| 5,761,683 A * | 6/1998 | Logan | G06F 16/9577 |
| | | | 715/206 |
| 5,787,437 A | 7/1998 | Potterveld et al. | |
| 5,794,232 A | 8/1998 | Mahlum et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,864,683 A * | 1/1999 | Boebert | G06F 21/53 |
| | | | 709/249 |
| 5,873,096 A | 2/1999 | Lim et al. | |
| 5,918,159 A | 6/1999 | Fomukong et al. | |
| 5,941,947 A | 8/1999 | Brown et al. | |
| 5,950,190 A | 9/1999 | Yeager et al. | |
| 5,963,953 A | 10/1999 | Cram et al. | |
| 5,974,409 A | 10/1999 | Sanu et al. | |
| 5,983,227 A | 11/1999 | Nazem et al. | |
| 5,987,471 A | 11/1999 | Bodine et al. | |
| 6,064,656 A | 5/2000 | Angal et al. | |
| 6,085,191 A | 7/2000 | Fisher et al. | |
| 6,092,083 A | 7/2000 | Brodersen et al. | |
| 6,112,198 A | 8/2000 | Lohman et al. | |
| 6,133,912 A * | 10/2000 | Montero | G06Q 30/02 |
| | | | 715/716 |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,226,641 B1 | 1/2001 | Hickson et al. | |
| 6,189,000 B1 | 2/2001 | Gwertzman et al. | |
| 6,189,011 B1 | 2/2001 | Lim et al. | |
| 6,189,024 B1 | 2/2001 | Bauersfeld et al. | |
| 6,216,133 B1 | 4/2001 | Masthoff | |
| 6,216,135 B1 | 4/2001 | Brodersen et al. | |
| 6,219,667 B1 | 4/2001 | Lu et al. | |
| 6,233,617 B1 | 5/2001 | Rothwein et al. | |
| 6,233,618 B1 | 5/2001 | Shannon | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,330,560 B1 | 12/2001 | Harrison et al. | |
| 6,332,127 B1 | 12/2001 | Bandera et al. | |
| 6,336,137 B1 | 1/2002 | Lee et al. | |
| 6,341,288 B1 | 1/2002 | Yach et al. | |
| 6,345,288 B1 | 2/2002 | Reed et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,438,562 B1 | 8/2002 | Gupta et al. | |
| 6,446,089 B1 | 9/2002 | Brodersen et al. | |
| 6,446,109 B2 | 9/2002 | Gupta | |
| 6,453,038 B1 | 9/2002 | McFarlane et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,578,037 B1 | 6/2003 | Wong et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,148 B1 | 8/2003 | Salo et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,658,417 B1 | 12/2003 | Statukis et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,721,765 B2 | 4/2004 | Ghosh et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshaysky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,839,680 B1 | 1/2005 | Liu et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 6,944,133 B2 | 9/2005 | Wisner et al. | |
| 6,947,927 B2 | 9/2005 | Chaudhuri et al. | |
| 7,013,001 B1 * | 3/2006 | Felger | G06Q 20/14 |
| | | | 379/114.01 |
| 7,062,502 B1 | 6/2006 | Kesler | |
| 7,069,231 B1 | 6/2006 | Cinarkaya et al. | |
| 7,069,497 B1 | 6/2006 | Desai | |
| 7,076,633 B2 | 7/2006 | Tormasov et al. | |
| 7,093,020 B1 | 8/2006 | McCarty et al. | |
| 7,100,111 B2 | 8/2006 | McElfresh et al. | |
| 7,152,109 B2 | 12/2006 | Suorsa et al. | |
| 7,174,483 B2 | 2/2007 | Worrall et al. | |
| 7,181,758 B1 | 2/2007 | Chan | |
| 7,185,192 B1 | 2/2007 | Kahn | |
| 7,206,805 B1 | 4/2007 | McLaughlin, Jr. | |
| 7,206,807 B2 | 4/2007 | Cheenath | |
| 7,209,929 B2 | 4/2007 | Dominguez, Jr. et al. | |
| 7,249,118 B2 | 7/2007 | Sandler et al. | |
| 7,269,590 B2 | 9/2007 | Hull et al. | |
| 7,289,976 B2 | 10/2007 | Kihneman et al. | |
| 7,301,900 B1 * | 11/2007 | Laksono | H04L 12/2856 |
| | | | 370/230 |
| 7,305,577 B2 | 12/2007 | Zhang | |
| 7,308,704 B2 | 12/2007 | Vogel et al. | |
| 7,340,411 B2 | 3/2008 | Cook | |
| 7,350,237 B2 | 3/2008 | Vogel et al. | |
| 7,356,482 B2 | 4/2008 | Frankland et al. | |
| 7,373,364 B1 | 5/2008 | Chapman | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,448,079 B2 | 11/2008 | Tremain | |
| 7,454,509 B2 | 11/2008 | Boulter et al. | |
| 7,484,219 B2 | 1/2009 | Mitra | |
| 7,508,789 B2 | 3/2009 | Chan | |
| 7,529,728 B2 | 5/2009 | Weissman et al. | |
| 7,577,092 B2 | 8/2009 | San Andres et al. | |
| 7,580,975 B2 | 8/2009 | Cheenath | |
| 7,599,935 B2 | 10/2009 | La Rotonda et al. | |
| 7,599,953 B2 | 10/2009 | Galindo-Lagaria et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,661,027 B2 | 2/2010 | Langen et al. | |
| 7,668,861 B2 | 2/2010 | Steven | |
| 7,693,820 B2 | 4/2010 | Larson et al. | |
| 7,698,160 B2 | 4/2010 | Beaven et al. | |
| 7,730,478 B2 | 6/2010 | Weissman | |
| 7,734,608 B2 | 6/2010 | Fell et al. | |
| 7,747,648 B1 | 6/2010 | Kraft et al. | |
| 7,769,825 B2 | 8/2010 | Karakashian et al. | |
| 7,774,366 B2 | 8/2010 | Fisher et al. | |

(56) References Cited

U.S. PATENT DOCUMENTS

| | | |
|---|---|---|
| 7,779,039 B2 | 8/2010 | Weissman et al. |
| 7,779,475 B2 | 8/2010 | Jakobson et al. |
| 7,814,052 B2 | 10/2010 | Bezar et al. |
| 7,814,470 B2 | 10/2010 | Mamou et al. |
| 7,827,138 B2 | 11/2010 | Salmon et al. |
| 7,827,208 B2 | 11/2010 | Bosworth et al. |
| 7,849,401 B2 | 12/2010 | Elsa et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,443,366 B1 | 5/2013 | Yancey |
| 8,457,545 B2 | 6/2013 | Chan |
| 8,473,518 B1 | 6/2013 | Yancey et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,667,563 B1 | 3/2014 | Sandoval |
| 8,776,067 B1 | 7/2014 | Yancey |
| 8,819,632 B2 | 8/2014 | Williams et al. |
| 8,972,431 B2 | 3/2015 | Press et al. |
| 8,977,675 B2 | 3/2015 | Tanaka |
| 9,069,901 B2 | 6/2015 | Varadharajan |
| 9,189,090 B2 | 11/2015 | Tanaka |
| 9,361,366 B1 | 6/2016 | Yancey et al. |
| 2001/0023440 A1 | 9/2001 | Franklin et al. |
| 2001/0044791 A1 | 11/2001 | Richter et al. |
| 2002/0016771 A1* | 2/2002 | Carothers .......... G06Q 20/1085 |
| | | 705/43 |
| 2002/0072951 A1 | 6/2002 | Lee et al. |
| 2002/0078372 A1* | 6/2002 | Aluzzo .................. G06F 21/32 |
| | | 726/22 |
| 2002/0082892 A1 | 6/2002 | Raffel et al. |
| 2002/0129352 A1 | 9/2002 | Brodersen et al. |
| 2002/0133392 A1 | 9/2002 | Angel et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0217332 A1 | 11/2003 | Smith et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015578 A1 | 1/2004 | Karakashian et al. |
| 2004/0015981 A1 | 1/2004 | Coker et al. |
| 2004/0027388 A1 | 2/2004 | Berg et al. |
| 2004/0044656 A1 | 3/2004 | Cheenath |
| 2004/0045004 A1 | 3/2004 | Cheenath |
| 2004/0111410 A1 | 6/2004 | Burgoon et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0220952 A1 | 11/2004 | Cheenath |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0149738 A1* | 7/2005 | Targosky ................ G06F 21/32 |
| | | 713/182 |
| 2005/0187934 A1* | 8/2005 | Motsinger ............ H04L 63/107 |
| 2005/0188318 A1 | 8/2005 | Tamir et al. |
| 2005/0283478 A1 | 12/2005 | Choi et al. |
| 2006/0075110 A1 | 4/2006 | Seraphin |
| 2006/0095960 A1 | 5/2006 | Arregoces et al. |
| 2006/0100912 A1 | 5/2006 | Kumar et al. |
| 2006/0136382 A1 | 6/2006 | Dettinger et al. |
| 2006/0248600 A1* | 11/2006 | O'Neill .................. G06F 21/31 |
| | | 726/29 |
| 2007/0078705 A1 | 4/2007 | Abels et al. |
| 2007/0088741 A1 | 4/2007 | Brooks et al. |
| 2007/0124276 A1 | 5/2007 | Weissman et al. |
| 2007/0130316 A1 | 6/2007 | Chan et al. |
| 2007/0130137 A1 | 6/2007 | Oliver et al. |
| 2007/0136571 A1* | 6/2007 | Lieu ....................... H04L 67/06 |
| | | 713/153 |
| 2007/0150546 A1 | 6/2007 | Karakashian et al. |
| 2007/0169175 A1* | 7/2007 | Hall ................... H04L 63/0807 |
| | | 726/3 |
| 2007/0226640 A1 | 9/2007 | Holbrook et al. |
| 2008/0010243 A1 | 1/2008 | Weissman et al. |
| 2008/0065991 A1 | 3/2008 | Grimes et al. |
| 2008/0082540 A1 | 4/2008 | Weissman et al. |
| 2008/0082572 A1 | 4/2008 | Ballard et al. |
| 2008/0082986 A1 | 4/2008 | Cheenath et al. |
| 2008/0086358 A1 | 4/2008 | Doshi et al. |
| 2008/0086447 A1 | 4/2008 | Weissman et al. |
| 2008/0086479 A1 | 4/2008 | Fry et al. |
| 2008/0086482 A1 | 4/2008 | Weissman et al. |
| 2008/0086514 A1 | 4/2008 | Weissman et al. |
| 2008/0086567 A1 | 4/2008 | Langen et al. |
| 2008/0086735 A1 | 4/2008 | Cheenath et al. |
| 2008/0101584 A1* | 5/2008 | Gray ...................... H04M 3/436 |
| | | 379/221.08 |
| 2008/0162544 A1 | 7/2008 | Weissman et al. |
| 2008/0201701 A1 | 8/2008 | Hofhansel et al. |
| 2008/0215560 A1 | 9/2008 | Bell et al. |
| 2008/0249972 A1 | 10/2008 | Dillon |
| 2008/0250026 A1 | 10/2008 | Linden et al. |
| 2008/0270354 A1 | 10/2008 | Weissman et al. |
| 2008/0270987 A1 | 10/2008 | Weissman et al. |
| 2009/0030906 A1 | 1/2009 | Doshi et al. |
| 2009/0049065 A1 | 2/2009 | Weissman et al. |
| 2009/0049101 A1 | 2/2009 | Weissman et al. |
| 2009/0049102 A1 | 2/2009 | Weissman et al. |
| 2009/0049288 A1 | 2/2009 | Weissman et al. |
| 2009/0063415 A1 | 3/2009 | Chatfield et al. |
| 2009/0100342 A1 | 4/2009 | Jakobson |
| 2009/0164283 A1 | 6/2009 | Coley |
| 2009/0177744 A1 | 7/2009 | Marlow et al. |
| 2009/0178134 A1* | 7/2009 | Dehaas .................. G06F 21/62 |
| | | 726/17 |
| 2009/0222670 A1* | 9/2009 | Mehta .................... G06F 1/16 |
| | | 713/186 |
| 2009/0276395 A1 | 11/2009 | Weissman et al. |
| 2009/0276405 A1 | 11/2009 | Weissman et al. |
| 2009/0282045 A1 | 11/2009 | Hsieh et al. |

(56) References Cited

U.S. PATENT DOCUMENTS

| | | |
|---|---|---|
| 2009/0319529 A1 | 12/2009 | Bartlett et al. |
| 2010/0191719 A1 | 7/2010 | Weissman et al. |
| 2010/0205216 A1 | 8/2010 | Durdik et al. |
| 2010/0211619 A1 | 8/2010 | Weissman et al. |
| 2010/0223284 A1 | 9/2010 | Brooks et al. |
| 2010/0235837 A1 | 9/2010 | Weissman et al. |
| 2010/0274779 A1 | 10/2010 | Weissman et al. |
| 2010/0319054 A1* | 12/2010 | Mehta .................. G06F 16/972 726/4 |
| 2011/0066977 A1 | 3/2011 | DeLuca et al. |
| 2011/0078213 A1 | 3/2011 | Bezar et al. |
| 2011/0218958 A1 | 9/2011 | Warshaysky et al. |
| 2011/0234482 A1 | 9/2011 | Tanaka |
| 2011/0238736 A1 | 9/2011 | Tanaka |
| 2011/0247051 A1 | 10/2011 | Bulumulla et al. |
| 2011/0276535 A1 | 11/2011 | Pin et al. |
| 2011/0276580 A1 | 11/2011 | Press et al. |
| 2011/0276834 A1 | 11/2011 | Calahan et al. |
| 2012/0011406 A1 | 1/2012 | Williams et al. |
| 2012/0042218 A1 | 2/2012 | Cinarkaya et al. |
| 2012/0047489 A1 | 2/2012 | Varadharajan |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0149917 A1 | 5/2015 | Tanaka |
| 2015/0172563 A1 | 6/2015 | Jakobson et al. |

OTHER PUBLICATIONS

U.S. Final Office Action dated Jan. 15, 2013 issued in U.S. Appl. No. 12/831,196.

U.S. Notice of Allowance dated Nov. 3, 2014 issued in U.S. Appl. No. 12/831,196.

U.S. Office Action dated Jul. 7, 2017 issued in U.S. Appl. No. 14/613,172.

U.S. Notice of Allowance dated Dec. 20, 2017 issued in U.S. Appl. No. 14/613,172.

Notification of Transmittal of the International Search Report and the Written Opinion of the International Searching Authority, or the Declaration. International Application No. PCT/US2010/050021. International Filing Date: Sep. 23, 2010.

"Customer Relationship Management" from Wikipedia, the free encyclopedia, [online]; [published on Oct. 16, 2008]; [retrieved on Feb. 26, 2010]; retrieved from http://en.wikipedia.org/wiki.Customer_Relationship_Management, 1 page.

"Flat file database"—Wikipedia, the free encyclopedia, [online]; [published on Apr. 22, 2008]; [retrieved on Feb. 26, 2010]; retrieved from http://en.wikipedia.org/wiki/Flat_file_database, 4 pp.

"Google Plus Users", Google+Ripples, Oct. 31, 2011 [retrieved on Feb. 21, 2012 from Internet at http://www.googleplusers.com/google-ripples.html], 3 pages.

"Push technology"—Wikipedia, the free encyclopedia, [online]; [published on Oct. 17, 2008]; [retrieved on Feb. 26, 2010]; retrieved from http://en.wikipedia.org/wiki/Push_technology, 4 pp.

"Relational database"—Wikipedia, the free encyclopedia, [online]; [published on Apr. 25, 2008]; [retrieved on Feb. 26, 2010]; retrieved from http://en.wikipedia.org/wiki/Relational_database, 6 pp.

Lee et al: "Composition of executable business process models by combining business rules and process flows", Expert Systems With Application, Oxford, GB, vol. 33, No. 1, Dec. 22, 2006, pp. 221-229.

Mietzer et al: "Combining Different Multi-Tenancy Patterns in Service-Oriented Applications", IEEE International Enterprise Distributed Object Computing Conference, NJ, USA, Sep. 1, 2009, pp. 131-140.

Wang et al: "Integrated Constraint Violation Handling for Dynamic Services Composition", IEE International Conference on Services Computing, NJ, USA, Sep. 21, 2009, pp. 168-175.

Wermelinger et al: "Using coordination contracts for flexible adaptation to changing business rules", Proceedings of the Sixth International Workshop on Software Evolution, NJ, USA, Sep. 1, 2003, pp. 115-120.

Wang et al: "A Study and Performance Evaluation of the Multi-Tenant Data Tier Design Patterns for Service Oriented Computing", IEEE International Conference on E-Business Engineering, NJ, USA, Oct. 22, 2008, pp. 94-101.

U.S. Appl. No. 12/549,349, filed Aug. 27, 2009, Durdik.

\* cited by examiner

FIG. 1
(BACKGROUND)

FIG. 2
(BACKGROUND)

METHODS AND SYSTEMS FOR PROVIDING TIME AND DATE SPECIFIC SOFTWARE USER INTERFACES

CROSS-REFERENCE TO RELATED PATENT APPLICATIONS

This application is a continuation of U.S. patent Ser. No. 14/613,172, filed Feb. 3, 2015, entitled METHODS AND SYSTEMS FOR PROVIDING TIME AND DATE SPECIFIC SOFTWARE USER INTERFACES, which is, in itself, a continuation of U.S. patent application Ser. No. 12/831,196 filed Jul. 6, 2010, entitled METHODS AND SYSTEMS FOR PROVIDING TIME AND DATE SPECIFIC SOFTWARE USER INTERFACES, which claims the benefit of U.S. Provisional Application No. 61/317,973 filed on Mar. 26, 2010, entitled METHOD FOR PROVIDING TIME AND DATE SPECIFIC COMPUTER INTERFACES; all of these applications are hereby incorporated herein by reference in their entireties.

BACKGROUND

The present invention generally relates to the computer systems, methods, and software for responding to remote client requests. More specifically, embodiments of the present invention pertain to responding to remote clients with content selected based on when the request is made.

Typical Web systems employ HTTP (Hypertext Transfer Protocol) as a communication protocol used between a Web browser and a Web server (i.e., HTTP server). In HTTP, communication is initiated by the Web browser. Namely, one HTTP communication is comprised of an HTTP request issued by the Web browser and an HTTP response returned by the Web server in response to the HTTP request.

Figure 1:
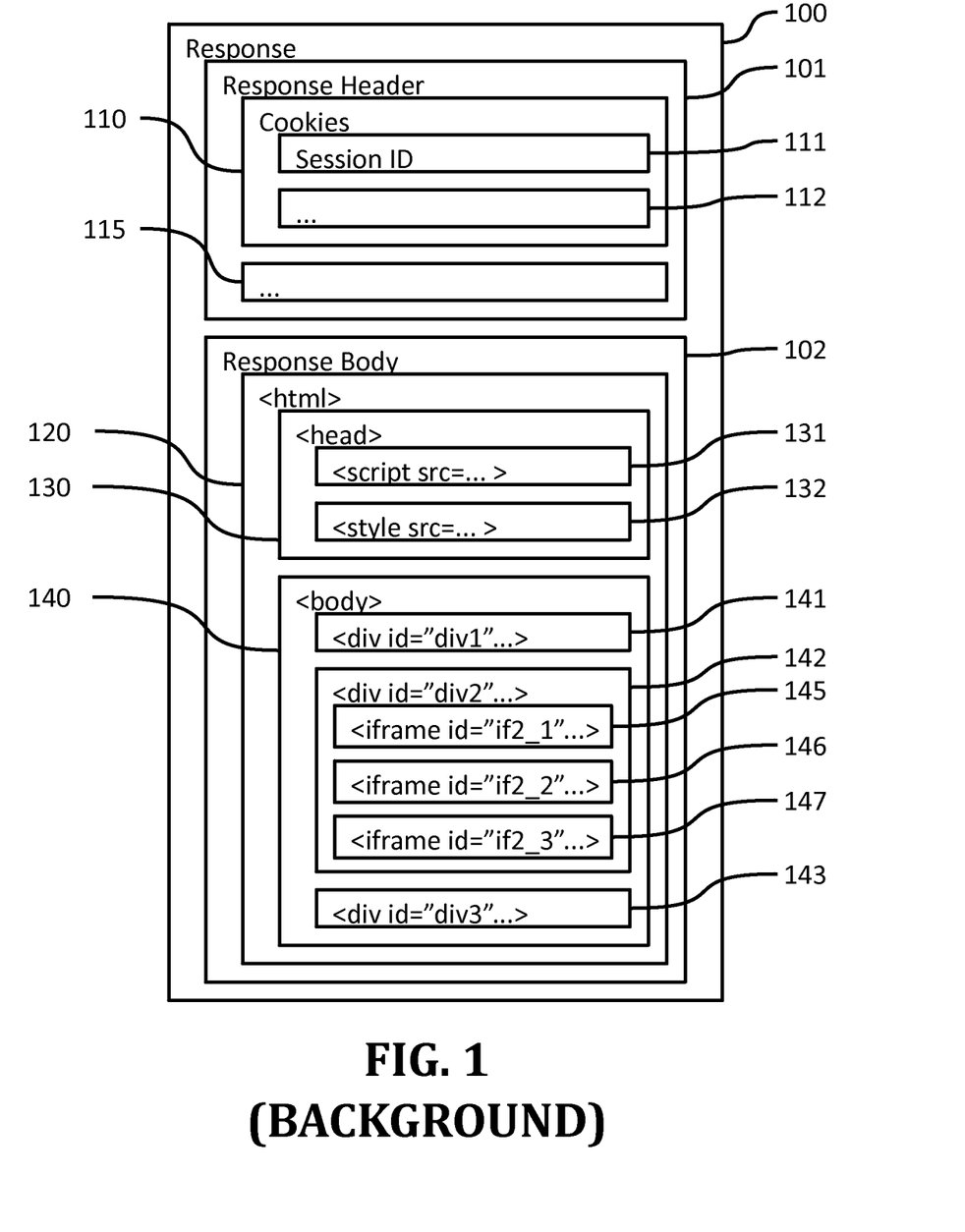
FIG. 1 is a diagram of an exemplary HTTP response.

Referring now to FIG. 1, a response 100 from a web server typically includes a response header 101 and a body 102. The header 101 may include cookies 110, such as a session id 111 which the Web browser can return to associate future requests with a single session. The body 102 typically comprises an HTML "page" 120 that includes both data and formatting information for display to a user of the Web browser. Many conventional Web applications divide a display area into interface components (e.g., portlets, sidebars, banners, etc.), where each component is associated with a particular task or type of data and given a portion of the Web browser display area.

Figure 2:
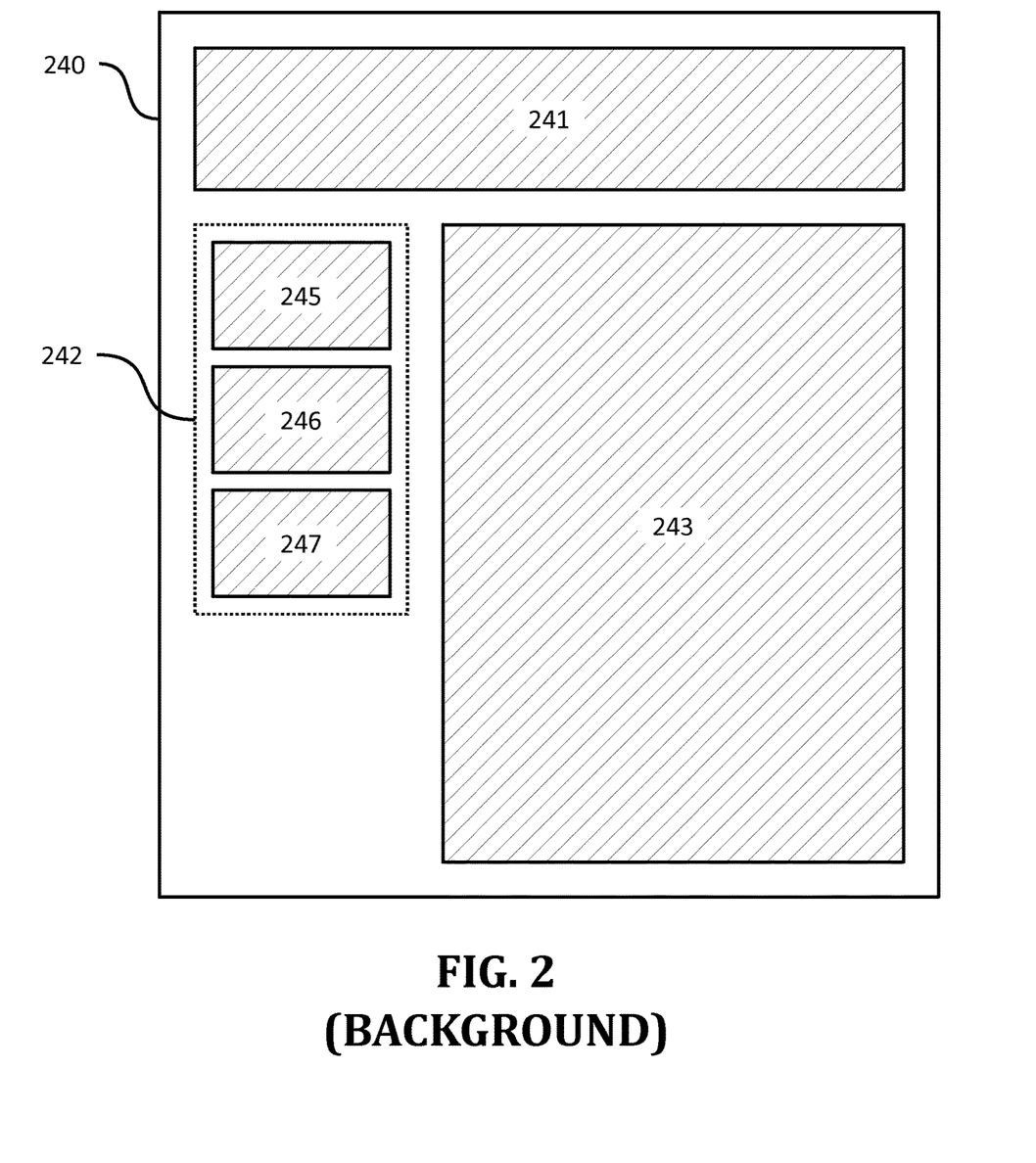
FIG. 2 is a diagram of an exemplary Web page layout.

FIG. 2 shows an exemplary web page display area 240 with a banner area 241, and sidebar area 242, and a main body area 243. Sidebar area 242 is further divided into areas 245, 246, and 247. These interface components may be incorporated within the body of a response within HTML sections such as <div> tags 141, 142, and 143 of FIG. 1) or may be references to external data (e.g., data to be retrieved by further HTTP requests) with HTML sections such as <iframe> tags 145, 146, and 147. An HTML page may also include interface components such as cascading style sheets (CSS) (e.g., <style> tag 132) and JavaScript code (e.g., <script> tag 131) to further define and/or customize the layout, formatting, behavior, and other attributes of the HTML page.

The user of a Web browser typically communicates with the Web server via a series of HTTP requests and responses. Each response typically provides links or other interface affordances (e.g., forms, JavaScript actions, etc.) to retrieve data and/or to perform tasks. Typically, a web page is built from the same set of interface components every time the user accesses a given Web page or application, unless new features or added or the user manually changes one or more of the interface components. For example, in a portal application the user may have configured a sports section, a financial news section, and a stock price section. When the user visits the portal Web application, the interface components are selected from the sections selected by the user. The same interface components are selected displayed every time the user visits the "home" page of the Web application. Thus, the user interface for a Web application generally remains the same, independent of the time of day, day of the week, day of the year, etc.

SUMMARY OF THE INVENTION

It would be beneficial to the user if the Web server were to change the user interface dynamically depending on the time at which the Web server is accessed in order to give the user quicker, easier, or automatic access to items, pages, data, or screens they need, without them having to explicitly select or request them. The embodiments described herein include methods and systems for responding to remote clients in a time and/or date sensitive manner. An embodiment of a method may include steps of receiving a request from a remote client, determining a time of day and/or a date for the request, selecting one or more interface components based on the time of day and/or date, and returning a response to the client including the selected interface components. In some embodiments, the method includes determining a time zone for the remote client and/or user and selecting one or more of the interface components based on the time adjusted for the time zone.

Interface components may be fully embedded in the response, or may be references to external components. The interface components may include, for example, style and/or formatting information (e.g., cascading style sheet [CSS] data), executable code (e.g., scripts, browser add-ons and extensions, Java applets, ActiveX controls, etc.), structured and/or formatted data, etc. Thus, one or more of the selected interface components may include data relating to a user task, where the task is particularly associated with a date and/or time of day. The interface components may further comprise instructions and/or formatting information for displaying the task data to the user of the remote client. Other interface components may include instructions and/or information (e.g., scripts, html forms, hyperlinks, etc.) for user interaction with the task data.

In an exemplary embodiment, the method may include determining a current time period (e.g., the current business day), determining a time of previous access by the remote client and/or the remote user, and selecting one or more of the interface components based on whether said time of previous access is within said current time period (e.g., to display tasks scheduled for the beginning of the business day).

In some embodiments, the method includes determining a time of previous access by the remote client and/or user and selecting one or more of the interface components based on a duration of a period between the time of previous access and the time of day for the request. In other embodiments, the method includes creating and/or accessing session data corresponding to the request and setting a session duration for the session data based on the time of day (e.g., to provide a longer login session during normal business hours and/or on business days).

In another embodiment, the method may include selecting one or more current time periods from a plurality of predefined time periods (e.g., "morning," "lunchtime," "afternoon", "during business hours," "holiday," etc.) and selecting one or more of the interface components based on the current time period(s).

These and other embodiments are described more fully below.

DETAILED DESCRIPTION OF THE INVENTION

The systems, methods, and software of the present invention provide mechanisms for providing the user of a remote client computer with a web application experience by acting upon time-based values in order to customize, stylize, or differentiate information displayed to the user, to help them work more effectively. Embodiments of the invention may, for example, present sets of data and/or tools adapted to the user's likely needs to help them prioritize and perform tasks at an appropriate time.

FIGS. 3-8 generally show exemplary methods including steps of receiving a request from a remote client, determining a time of day and/or a date for the request, selecting one or more interface components based on the time of day and/or date, and returning a response to the client including the selected interface components. It will be recognized that the methods described herein may be implemented as software instructions to be executed on one or more computer processing systems.

Figure 3:
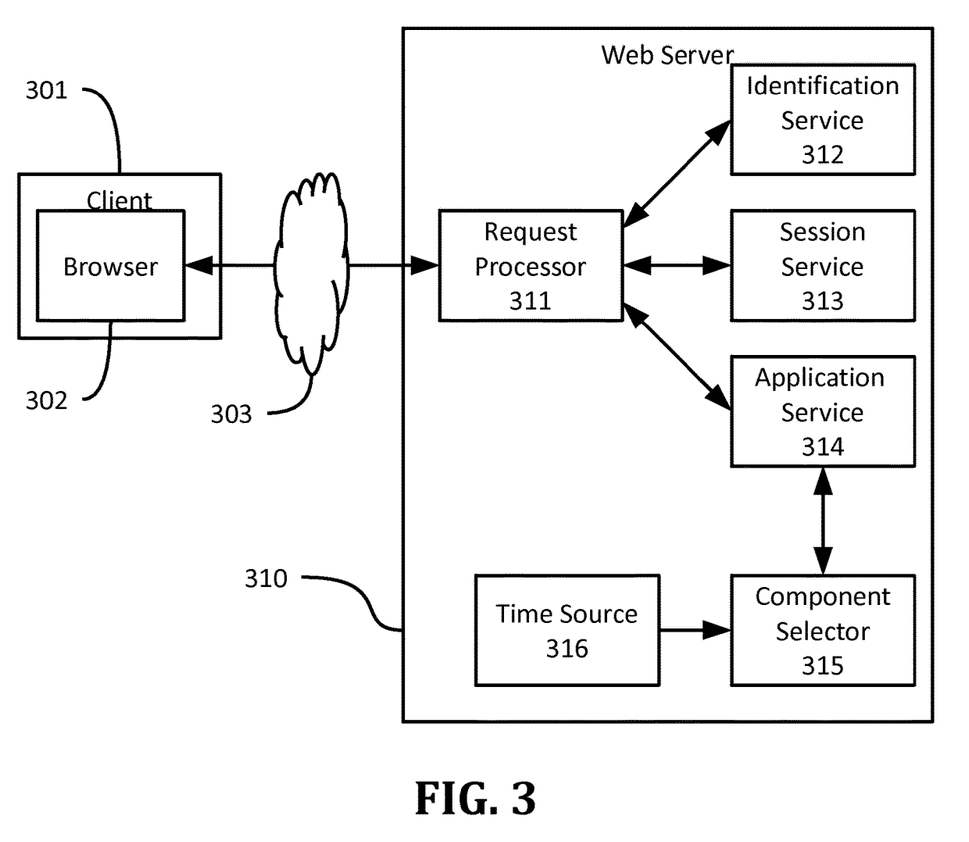
FIG. 3 is a diagram of an exemplary Web application server and client.

FIG. 3 shows an exemplary web server 310 communicating over network 303 with a browser software application 302 running on a client computer system 301. It will be recognized that web server 310 generally includes a plurality of software components, and that any of these components may be running on multiple computer processors, and that each of the exemplary components described herein may be further so subdivided.

Request processor 311 may comprise an HTTP server such as the Apache HTTP server, Microsoft Internet Information Services, etc. While the embodiments herein are generally described in terms of HTTP communication protocols and HTML presentation formats, it will be recognized by those skilled in the art that the concepts are applicable to a wide variety of communication protocols and data formats. Furthermore the client software may include, in addition to web browsers, dashboard applications, sidebars, tickers, etc. In an exemplary implementation, request processor 311 receives a request and parses the request to determine how to respond. Request processor 311 may simply return a data file specified by the request, or may delegate processing to another component (e.g., to application service 314) based on the request. In addition, request processor 311 may communicate with identification server 312 to associate the request with a particular client system and/or user (e.g., based on login credentials provided by the user). Request processor 311 may also communicate with session service 313 to associate the request with user session data (e.g., data stored on the web server in order to maintain a session state between requests).

Application service 314 may comprise a custom web application configured to process one or more types of requests from request processor, or may comprise a conventional web application server or object request broker. In exemplary embodiments, the application service 314 communicates, directly or indirectly, with a component selector 315 configured to receive a time and/or date from time source 316 and to select one or more interface components based on the time of day and/or date.

Component selector 315 may select interface components based on, for example, time of day, day of week, day of month, month within the fiscal quarter, holidays, business days, day or night, typically active time for the user, or off-hours for the user based on their historical norm, number of minutes since the last login, number of minutes since the last view of a given page, screen, or record set, number of minutes since login, number of minutes until the user session will expire, number of minutes since last user session ended, any combination of the above, etc.

Exemplary components that the component selector 315 may select may include landing pages, redirect URLs, or other screens to display after login success or initiation of the application, portlets or summary views to display on a "Home" page, executive dashboard views, dashboard view orders, tab orders, styles, scripts, executable code (e.g., Java Applets, ActiveX controls, Adobe Flash applications), etc. The application service 314 or other components may also adjust other aspects of the response and/or session in response to the time, such as whether previous session data or cookies are reused, session duration, etc.

Figure 4:
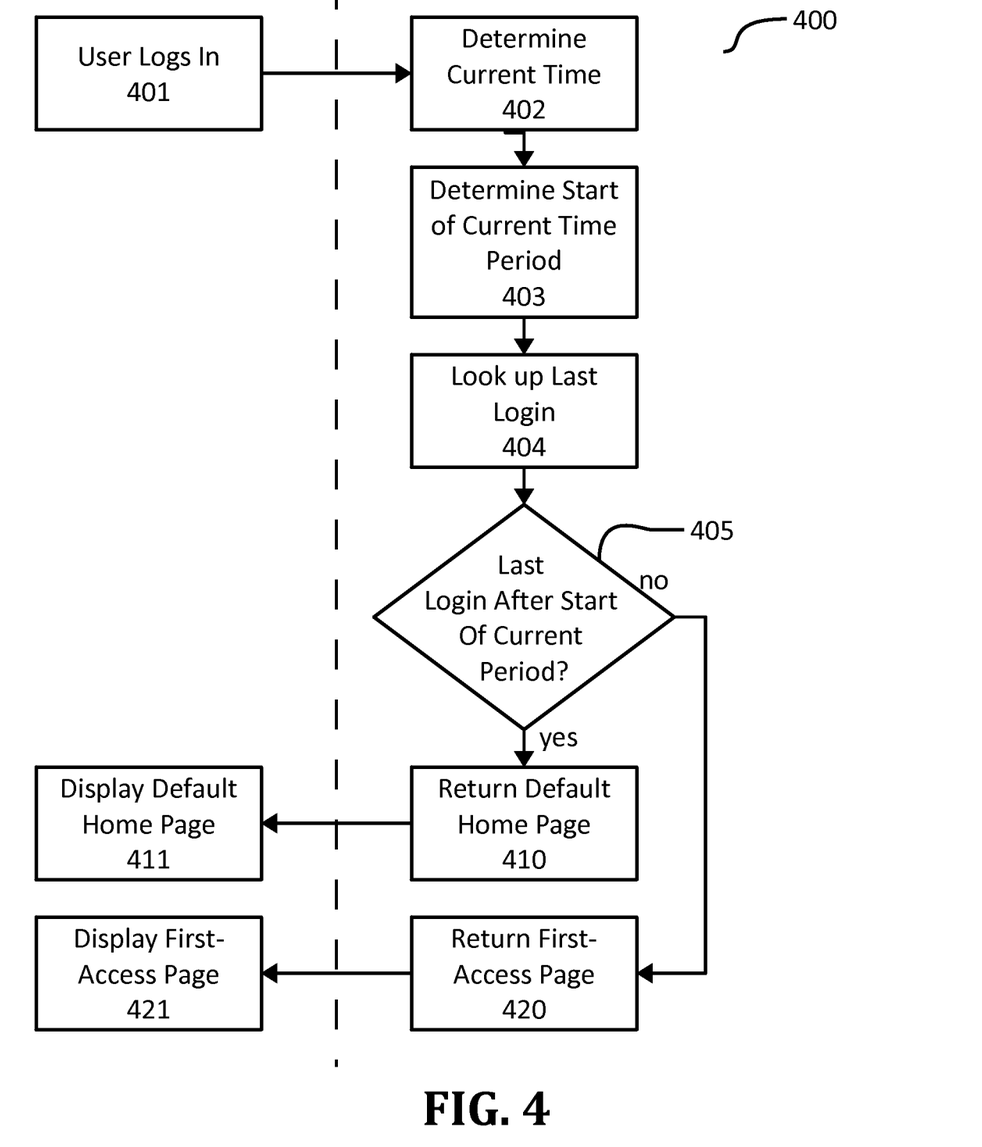
FIG. 4 is a flowchart showing an exemplary method for customizing a response for a user's first access during a time period.

Referring now to FIG. 4, flowchart 400 shows an exemplary method for customizing a response for a user's first access during a time period. At step 401, a user logs in to an application. For example, the user may enter a username and password, or use other login credentials, on a login page for a support case tracking web application. At step 402, the application determines the current time. At step 403, the application uses the current time to determine the current time period and the start time for that period. For example, a "user day" may be configured to begin at 3 A.M. each day.

At step 405, the application determines whether the user has previously logged or otherwise accessed the application after the start of the current period. If the user has previously logged in during the current period, then the application may return a default application home page including a default set of components at step 410. The browser or other client application then displays the default page at step 411. If, however, the user has not logged in to the system since the start of the current period, then the application may proceed to step 420 to return a set of components customized for a "first of the day" page. For example, in a support case tracking web application the "first of the day" page may include one or more components to show support cases and tasks scheduled for the day, cases that have not been updated in the last 72 hours, cases that have been opened since their last "first of the day" login, etc.

Figure 5:
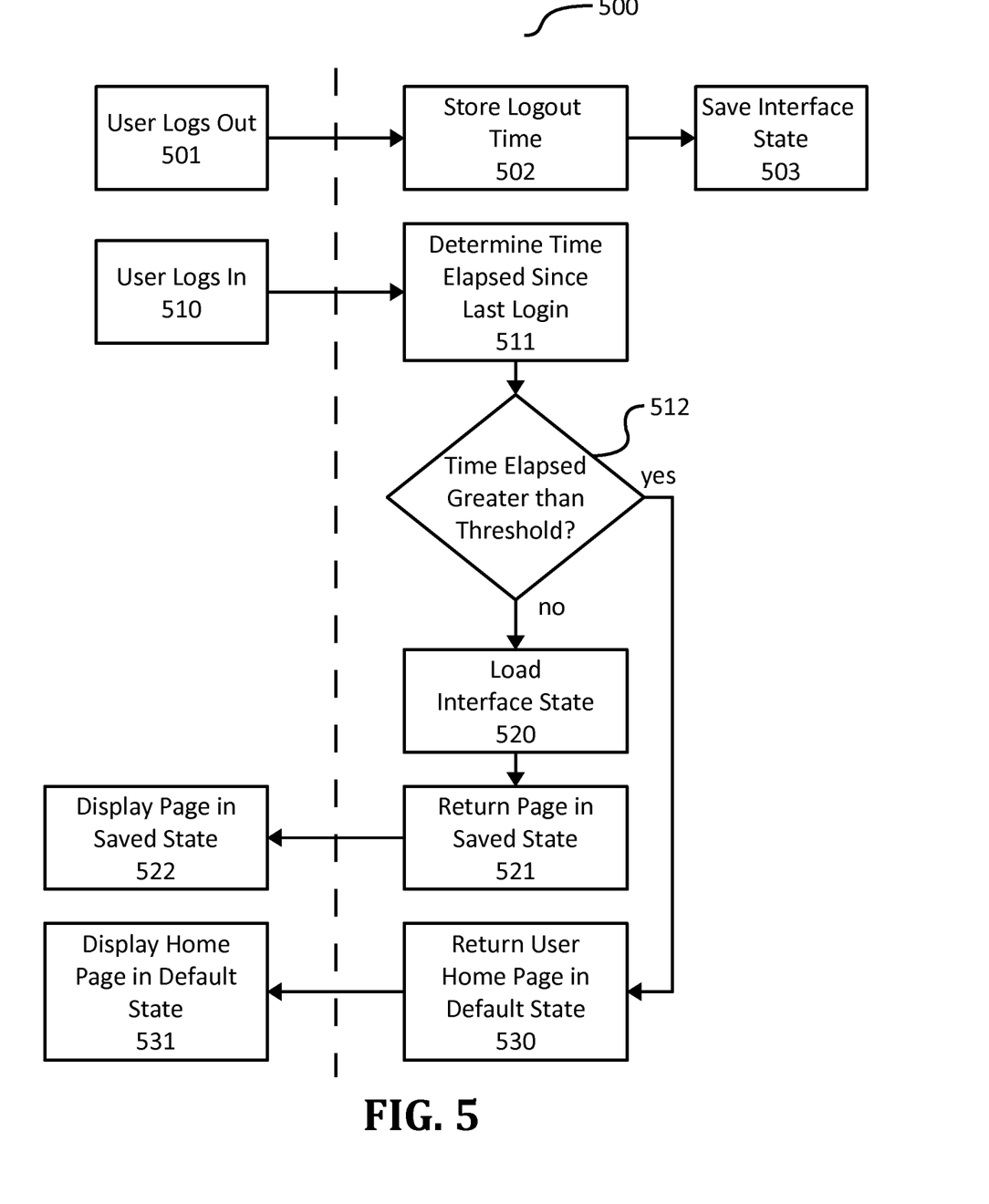
FIG. 5 is a flowchart showing an exemplary method for customizing a response based on the time of a user's previous access.

Referring now to FIG. 5, flowchart 500 shows an exemplary method for customizing a response based on the time of a user's previous access. At step 500, a user of a remote client logs out of the web application. At step 502, in processing the log-out request, the web application stores a time of the logout and at step 503 saves an interface state.

At step 510, the user logs in again. At step 511, the application determines the amount of time elapsed since the last login. At step 512, the application determines whether the time elapsed is greater than some threshold (e.g., one hour). If the time elapsed is not greater than the threshold, then the application loads the saved interface state at step 520 and returns a page in the saved state at step 521. For example, the page with saved state may include persisted values for a current page, search history, navigation tree state, etc. Otherwise, at step 530 the application may return a default home page (e.g., with no search history, a fully closed set of folders in the navigation tree, etc.).

Figure 6:
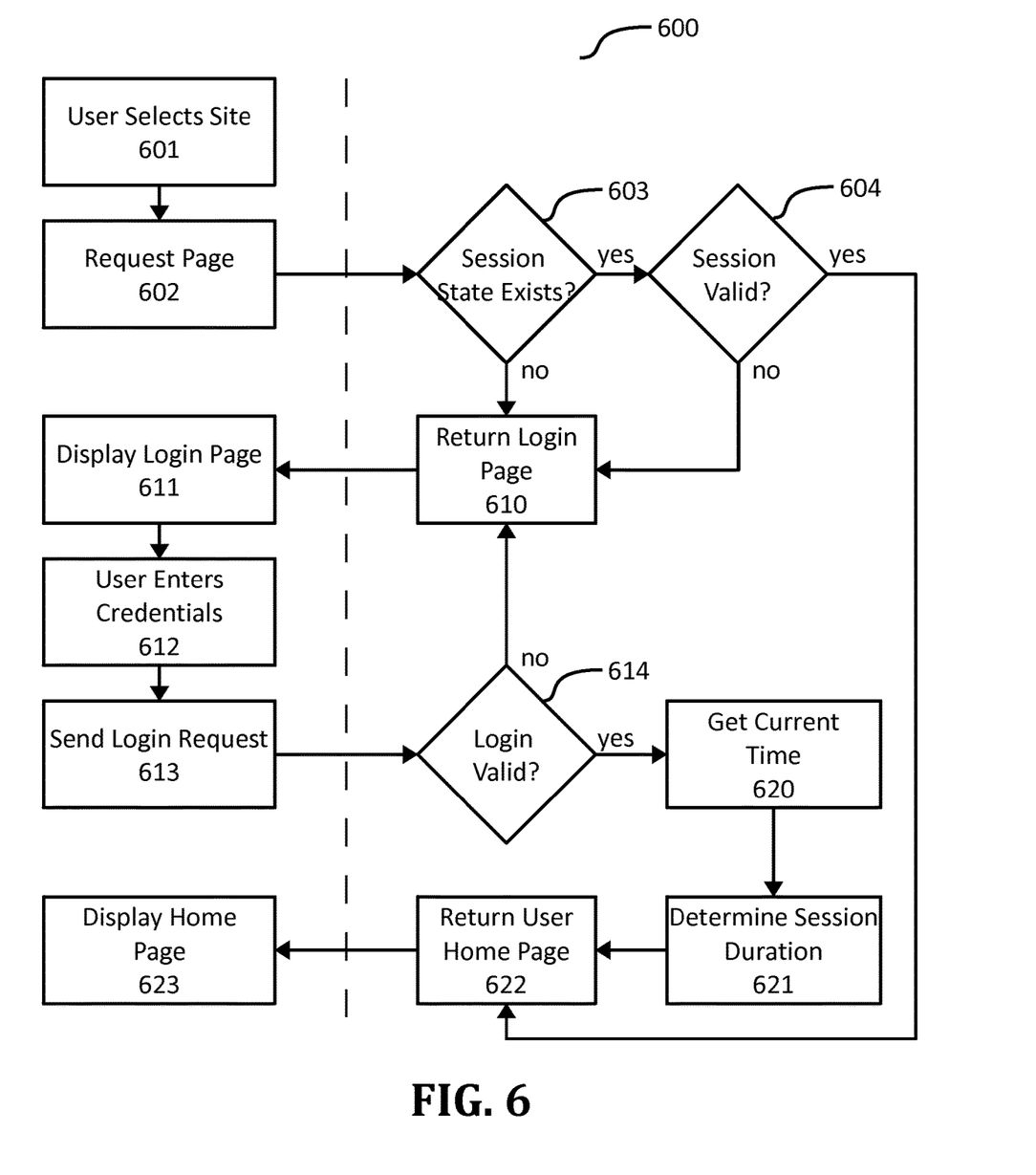
FIG. 6 is a flowchart showing an exemplary method for customizing a response based on the time of login.

Referring now to FIG. 6, flowchart 600 shows an exemplary method for customizing a response based on the time of login. At step 601 a user selects the application site (e.g., from a bookmark/favorites list, from a portal application, etc.) and at step 602 the client browser requests the appropriate page. At step 603 the application determines whether there is any session state associated with the request (e.g., from a session cookie or other parameter included in the request) and at step 604 determines whether the session is valid. If there is no valid session, then at step 610 the application returns a login page. In step 611 the client browser displays the login page. At step 612 the user enters login credentials, and at step 613 the client browser sends a login request to the application. At step 614 the application determines whether the login credentials are valid. If not, the login page is returned again at step 610.

If the login is valid, then the application proceeds to step 620 to determine the current time. At step 621, the application determines the session duration based on the current time. For example, if the current time is within the window of normal business hours Monday-Friday for the company (or user, if per-user values are available), the session may be granted with a duration of eight hours. If the current time is outside of normal business hours, then a different duration may be granted. For example, between 6 am and 8 pm on a normal workday, a four hour session may be granted. Or, a one hour session may be granted. Note that, in this example and all other examples, the duration of a session and the time period to which the duration applies can be defined in a variety of ways. In some implementations, the duration and time period are defined to maximize hardware resources. In other implementations, the duration and time periods are based on business needs, client agreement, or some other factor/combination of factors.

Figure 7:
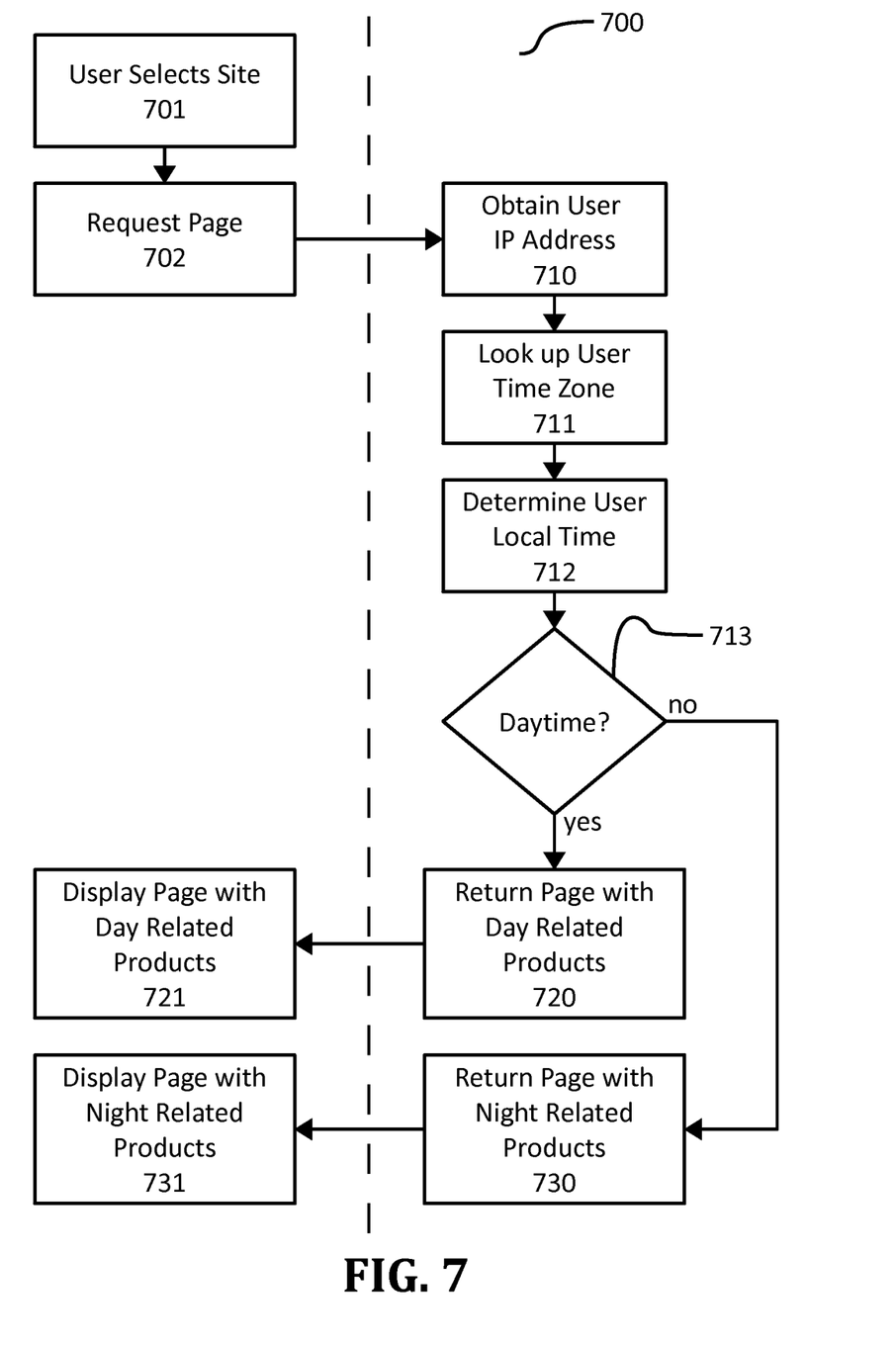
FIG. 7 is a flowchart showing an exemplary method for changing products included in a response based on the time of day.

Referring now to FIG. 7, flowchart 700 shows an exemplary method for changing products included in a response based on the time of day. At steps 701 and 702 the user selects the site and the browser sends a request to the application. At step 710, the application determines an internet protocol (IP) address of the client system. At step 711 the application determines a time zone for the user based on the IP address (e.g., using a GeoIP database) and at step 712 determines the user's local time by adjusting for the time zone. At step 713 the application determines the current time period, e.g. "daytime", for the user of the remote client. At step 720, the application returns a page based on the current time period. For example, if it is "daytime" at step 720 the application may return a page including business use or other "daytime" products on the page. Otherwise, at step 730 the application may return a page including other information for home use or "nighttime" products on the page.

Figure 8:
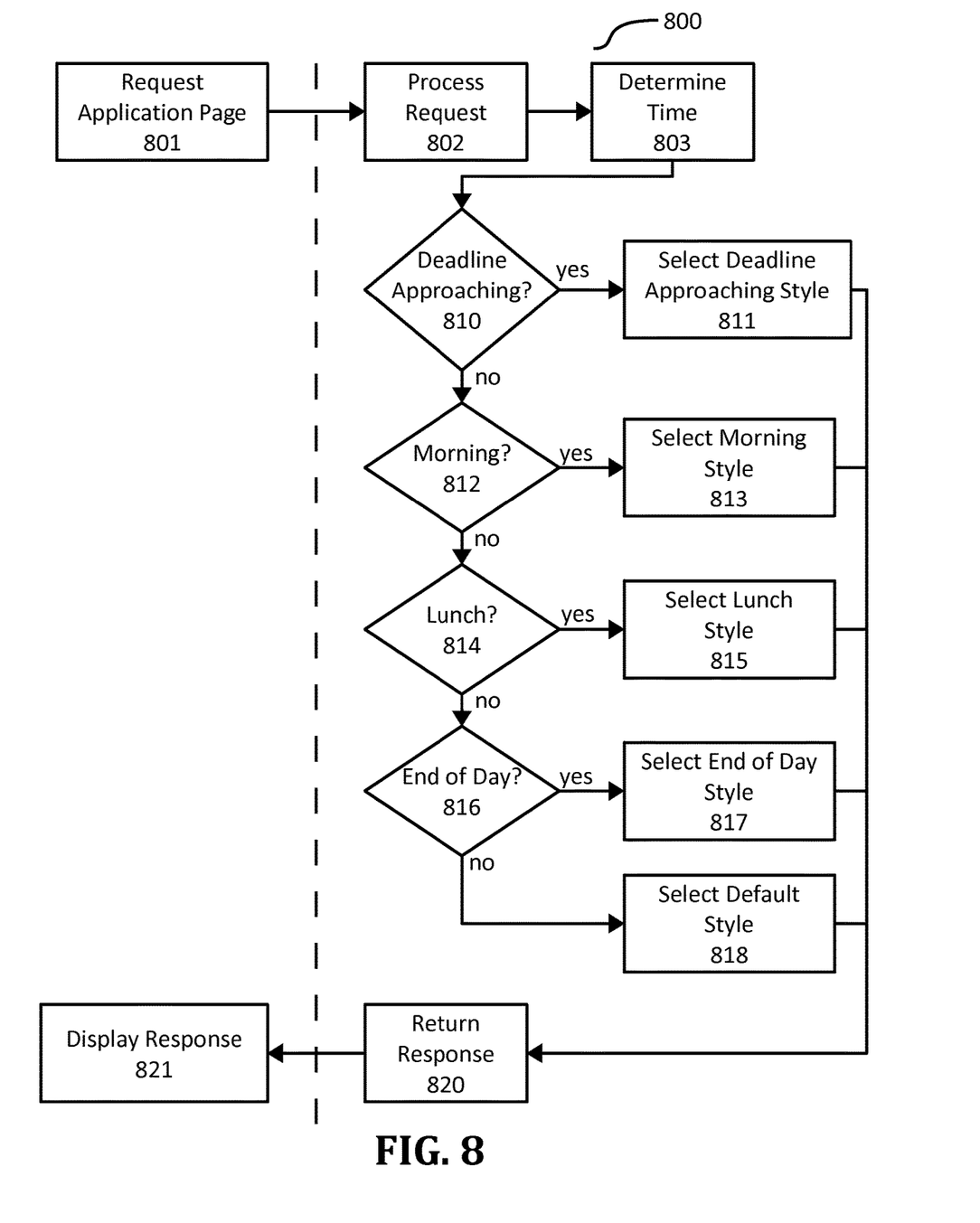
FIG. 8 is a flowchart showing an exemplary method for changing display styles in a response based on the time of day.

Referring now to FIG. 8, flowchart 800 shows an exemplary method for changing display styles in a response based on the time of day. An exemplary web application may generally be styled with primarily black text on a white background, with blue trim. Throughout the day, the remote client may request application pages at step 801, either in response to user activity or in response to scripts or other application logic executed on the client. The application processes the request at step 802, and at least part of the processing may include steps 803-818 to modify the display of the site in response to the time of day. Thus at step 803 the application determines the current time. In steps 810, 812, 814, and 816 the application may compare the current time to one or more predefined time periods (e.g., deadline approaching, morning, lunchtime, end of day) and adjust style components appropriately at steps 811, 813, 815, 817, and 818.

Thus, as the day progresses the default blue trim may change appearance slightly, becoming lighter during the mornings and through the afternoon, and progressively darker through late afternoon through evening, and very dark blue at night. For a business application or corporate intranet site, for example, the application may unobtrusively give workers an update on the relative time of day. While a digital clock included with most operating systems provides a specific time of day, the coloring could provide timing subtle cues to the user. For example, a schedule component may fade to gray during lunch break for a worker, fade to red if an action hasn't been taken in a given amount of time, fade to black as the dedicated call center hour's end of day approaches, etc.

Thus, the present invention provides methods, software, and computer systems for changing the user interface of a web application dynamically depending on the time at which the Web server is accessed in order to give the user quicker, easier, or automatic access to items, pages, data, or screens they need, without the user having to explicitly select or request these particular components.

It should be understood that the foregoing description is merely an example of the invention and that modifications and may be made thereto without departing from the spirit and scope of the invention and should not be construed as limiting the scope of the invention. The scope of the invention, therefore, should be determined with respect to the appended claims, including the full scope of equivalents thereof.

What is claimed is:

1. A computer processing system including one or more processors and a memory, the one or more processors configured to cause:
   obtaining a login request from a remote client;
   determining that the login request is valid;
   determining a time of day for the login request;
   determining a session duration based on determining that the login request is valid, wherein the session duration is based, at least in part, on the time of day for the login request; and
   granting a session having the session duration responsive to determining that the login request is valid.

2. The computer processing system of claim 1, wherein the session duration is determined at least in part by:

identifying a first predefined time period during which the login request was received, wherein the first predefined time period is one of a plurality of predefined time periods, each predetermined time period is associated with a session duration, and the session durations associated with the predetermined time periods are not all the same.

3. The computer processing system of claim 1, wherein the session duration is determined based, at least in part, on the time of day for the login request being within a predefined time window.

4. The computer processing system of claim 3, wherein the session duration includes a first non-zero duration based on the time of day for the login request being within normal business hours.

5. The computer processing system of claim 4, wherein normal business hours are between 6:00 AM and 8:00 PM Monday through Friday for a local time of the remote client.

6. The computer processing system of claim 4, wherein the first non-zero duration is selected from the group consisting of: one hour, four hours, and eight hours.

7. The computer processing system of claim 4, wherein the session duration includes a second non-zero duration based on the time of day for the login request being outside of normal business hours, wherein the first non-zero duration is different from the second non-zero duration.

8. A method implemented by a computer processing system, the method comprising:
  receiving, by the computer processing system, a login request from a remote client;
  determining, by the computer processing system, that the login request is valid;
  determining, by the computer processing system, a time of day for the login request;
  determining, by the computer processing system, a session duration based on determining that the login request is valid, wherein the session duration is based, at least in part, on the time of day for the login request; and
  granting, by the computer processing system, a session having the session duration responsive to determining that the login request is valid.

9. The method of claim 8, wherein the determining, by the computer processing system, the session duration based, at least in part, on the time of day for the login request includes:
  identifying, by the computer processing system, a first predefined time period during which the login request was received, wherein the first predefined time period is one of a plurality of predefined time periods, each predetermined time period is associated with a session duration, and the session durations associated with the predetermined time periods are not all the same.

10. The method of claim 8, wherein the determining, by the computer processing system, the session duration is based, at least in part, on the time of day for the login request being within a predefined time window.

11. The method of claim 10, wherein determining, by the computer processing system, the session duration based, at least in part, on the time of day for the login request includes determining that the session duration is a first duration based on the time of day for the login request being within normal business hours.

12. The method of claim 11, wherein the first duration is selected from the group consisting of: one hour, four hours, and eight hours.

13. The method of claim 10, wherein determining, by the computer processing system, the session duration based, at least in part, on the time of day for the login request includes determining that the session duration is a first non-zero duration based on the time of day for the login request being outside of normal business hours.

14. A non-transitory computer-readable medium storing computer-readable program code configured to be executed by one or more processors, the program code including instructions configured to cause:
  obtaining a login request from a remote client;
  determining that the login request is valid;
  determining a time of day for the login request;
  determining a session duration based on determining that the login request is valid, wherein the session duration is based, at least in part, on the time of day for the login request; and
  granting a session having the session duration responsive to determining that the login request is valid.

15. The non-transitory computer-readable medium of claim 14, wherein the session duration is determined at least in part by:
  identifying a first predefined time period during which the login request was received, wherein the first predefined time period is one of a plurality of predefined time periods, each predetermined time period is associated with a session duration, and the session durations associated with the predetermined time periods are not all the same.

16. The non-transitory computer-readable medium of claim 14, wherein the session duration is determined based, at least in part, on the time of day for the login request being within a predefined time window.

17. The non-transitory computer-readable medium of claim 16, wherein the session duration includes a first non-zero duration based on the time of day for the login request being within normal business hours.

18. The non-transitory computer-readable medium of claim 17, wherein normal business hours are between 6:00 AM and 8:00 PM Monday through Friday for a local time of the remote client.

19. The non-transitory computer-readable medium of claim 17, wherein the first non-zero duration is selected from the group consisting of: one hour, four hours, and eight hours.

20. The non-transitory computer-readable medium of claim 17, wherein the session duration includes a second non-zero duration based on the time of day for the login request being outside of normal business hours, wherein the first non-zero duration is different from the second non-zero duration.

* * * * *